Aug. 27, 1929.                W. FERRIS                1,726,481
                         HYDRAULIC TRANSMISSION
                          Filed Aug. 3, 1925          3 Sheets-Sheet 2

INVENTOR.
WALTER FERRIS.
BY
ATTORNEY.

Aug. 27, 1929.  W. FERRIS  1,726,481
HYDRAULIC TRANSMISSION
Filed Aug. 3, 1925   3 Sheets-Sheet 3

INVENTOR.
WALTER FERRIS.
BY
ATTORNEY.

Patented Aug. 27, 1929.

1,726,481

UNITED STATES PATENT OFFICE.

WALTER FERRIS, OF MILWAUKEE, WISCONSIN, ASSIGNOR TO THE OILGEAR COMPANY, OF MILWAUKEE, WISCONSIN, A CORPORATION OF WISCONSIN.

HYDRAULIC TRANSMISSION.

Application filed August 3, 1925. Serial No. 47,991.

This invention relates to variable speed power transmissions of the type involving a pump and motor operatively connected by a hydraulic circuit.

In a machine equipped with a transmission of this character there is ordinarily a wide variation in the demands upon the motor, both as to driving torque and speed, during various stages and conditions of operation. In some classes of machine tools, for instance, a rather high motor torque at moderate variable speeds is desirable when operating in one direction, as during a working or feeding stroke, whereas during a return stroke high speeds are desirable while the torque demands are quite low.

One object of the present invention is the provision of a hydraulic transmission in which the pump and motor are so correlated and controlled as to provide operating characteristics best suited for a given installation.

Another object is the provision of a novel reversing valve between the pump and motor by which the operating characteristics may be varied.

Another object is to improve the construction and operation of hydraulic transmissions.

Other objects and advantages will appear from the following description of an illustrative embodiment of the present invention.

Figure 1:
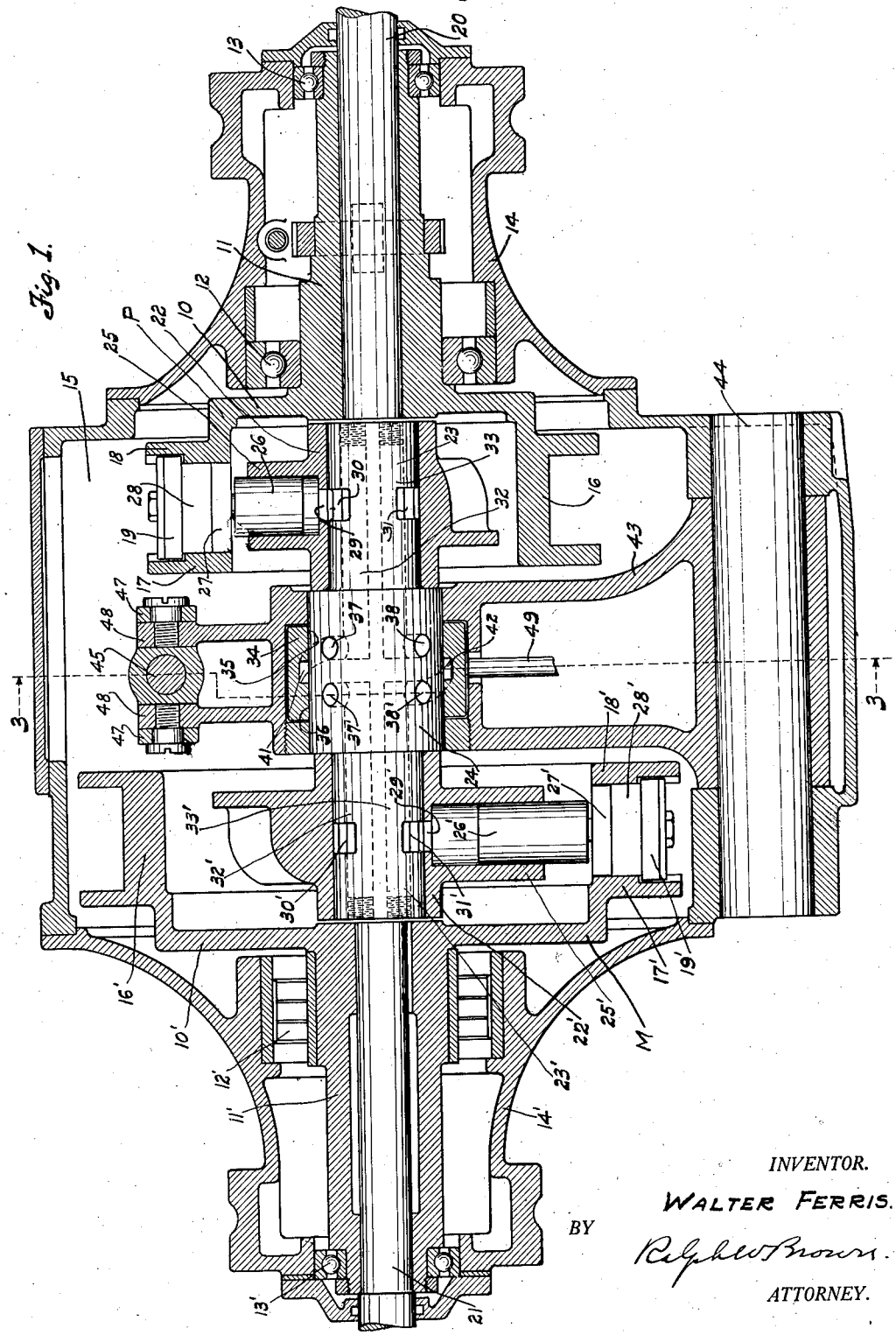
Figure 1 is a vertical sectional view of a hydraulic transmission constructed in accordance with the present invention.

The hydraulic transmission shown comprises a variable displacement pump P and a variable displacement motor M of substantially identical construction except that the motor is of greater capacity than the pump. Each includes a disk 10, 10′ having an integral hub or sleeve 11, 11′ journaled in spaced bearings 12, 12′ and 13, 13′, mounted in the opposite ends 14, 14′ of an enclosing casing 15. Rings 16, 16′, carried by the disks 10, 10′, are provided with spaced walls 17, 17′ and 18, 18′, grooved to removably receive a series of tangential reaction plates 19, 19′. The pump disk 10 is driven by a shaft 20 keyed in the hub 11 and the motor disk 10′ drives a shaft 21 keyed in the hub 11′.

A pump cylinder barrel 22 and motor cylinder barrel 22′ are arranged within the pump and motor rings 16 and 16′, respectively. Each cylinder barrel is closely fitted for rotation upon an end 23, 23′ of a pintle 24, and each is provided with a radial series of cylinders 25, 25′ integral therewith, each cylinder extending substantially normal to one of the reaction plates 19, 19′ in the rings 16, 16′. A piston or plunger 26, 26′, closely fitted for reciprocation in each cylinder, carries a crosshead 27, 27′ extending substantially parallel with and spaced from one of the reaction plates 19, 19′. A set 28, 28′ of roller elements between each reaction plate and crosshead permits free lengthwise reciprocation therebetween and reacts under the transmitted pressure to maintain these parts in parallelism. Each cylinder 25, 25′ is provided with a port 29, 29′ adapted to register successively with ports 30, 30′ and 31, 31′ in the ends 23, 23′ of the pintle during rotation of the cylinder barrel thereon. Ports 30 and 31 communicate, respectively, with upper and lower pairs of passages 32 and 33 in the pump end of the pintle and ports 30′ and 31′ with upper and lower pairs of passages 32′ and 33′ in the motor end of the pintle. Pump and motors of this type are now well known in the art so that a further or more detailed description thereof is deemed unnecessary.

In the transmission shown a valve is employed for effecting and controlling communication between the pintle passages 32, 32′, 33 and 33′. In this instance, this valve comprises a collar 34 having a cylindrical inner surface 35 closely fitted for rotation upon the cylindrical surface 36 of the pintle 24 intermediate the ends thereof. The cylindrical surface 36 is pierced by four equally spaced ports 37, 38 arranged in a circle about the pintle and a similar series of ports 37′, 38′ spaced from ports 37, 38. Both of the upper ports 37 communicate with both of the upper pintle passages 32 through an angular passage 39, and both of the lower ports 38 communicate with both of the lower pintle passages 33 through an angular passage 40. Similar passages 39′ and 40′ effect communication between ports 37′ and passages 32′ and between ports 38' and passages 33', respectively.

Figure 3:
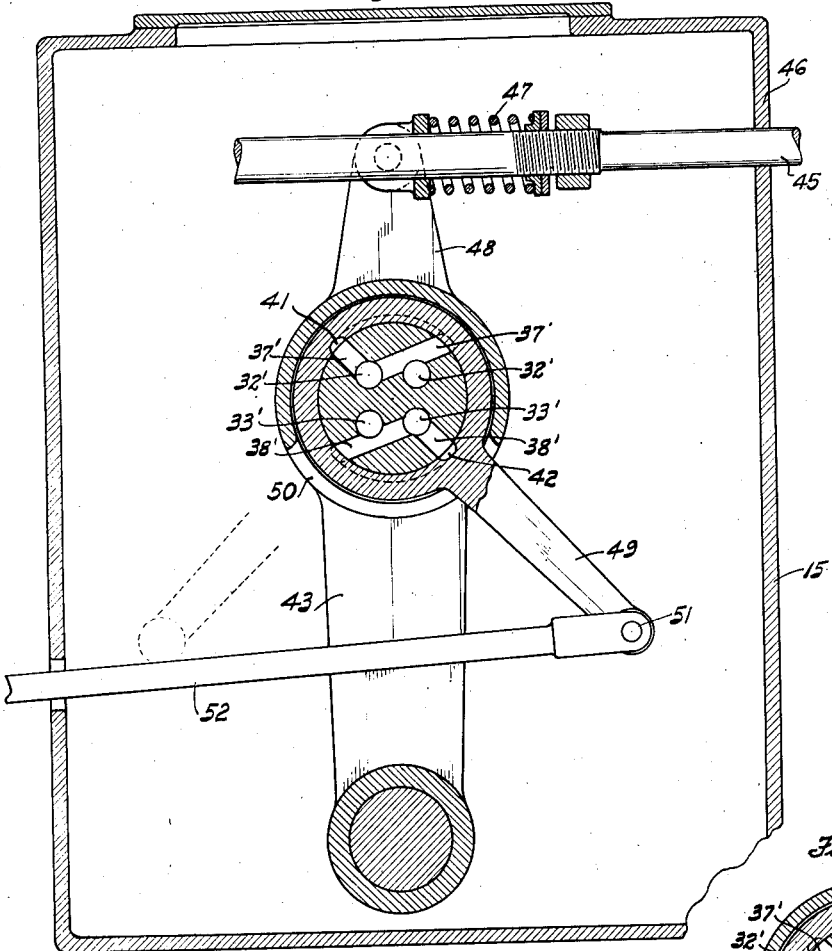
Figure 3 is a transverse sectional view taken substantially along the line 3—3 of Figure 1.

Two spiral channels 41 and 42 are formed in the cylindrical surface 35 of the collar. Each channel extends through an angle of substantially ninety degrees about the pintle, one end thereof being so disposed as to register with one or another of the series of ports 37, 38 while the other end is adapted to register with one or another of the series of ports 37', 38'. The arrangement is such that when the valve collar 34 is in the position shown in Figure 3 channel 41 connects one of the ports 37 with one of the ports 37' and channel 42 connects one of the ports 38 with one of the ports 38'. In this position of the valve fluid delivered from the pump through passages 32, passes through passage 39 and one of the ports 37, into and through the channel 41, (in the full line position of Figure 5) and through one of the ports 37', passage 39' and passages 32' to the motor to operate the motor in one direction. Fluid discharged from the motor returns to the pump through passages 33', passage 40', port 38', channel 42, port 38, passage 40 and passages 33.

Figure 5:
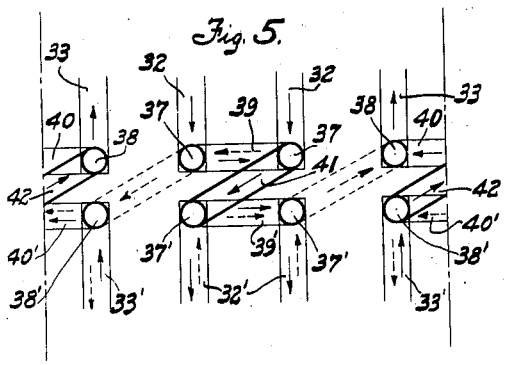
Figure 5 is a development of the cylindrical valve seat, diagrammatically indicating the arrangement of valve ducts and ports in the two positions of the valve.
Figure 4:
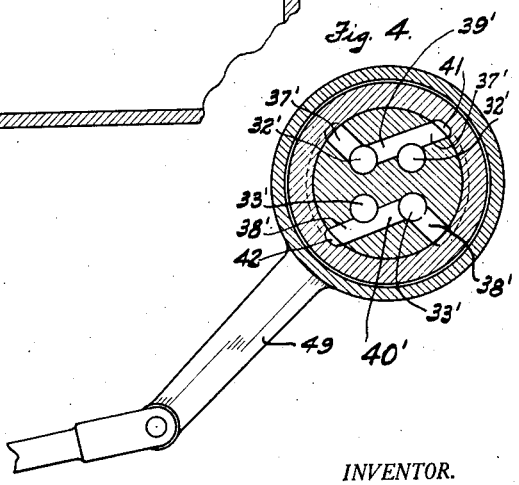
Figure 4 is a sectional view of a reversing valve.

By rotating the valve collar 34 through an angle of ninety degrees into the position shown in Figure 4 channels 42 and 41 assume the dotted line positions of Figure 5. In this position, fluid delivered from the pump into passages 32 passes through passage 39 and port 37, into and through channel 42, through port 38', passage 40' and passages 33' to the motor to operate the motor in the reverse direction. In this position of the valve fluid discharged from the motor returns to the pump through passages 32', passage 39', port 37', channel 41, port 38, passage 40 and passages 33. It will thus be noted that reversal of the motor may be effected by shifting the valve from one to the other of the two positions indicated.

It is a well known fact that the fluid displacement of a pump or motor of the type herein illustrated is directly proportional to the distance between the axes of rotation of the disk 10 or 10' and the cylinder barrel 22 or 22'. Thus in the case of the pump when the axes of rotation of the pump disk and cylinder barrel are coincident pump displacement is zero, and, when one axis is laterally offset with respect to the other, the rate and direction of fluid flow from the pump is dependent upon the degree and direction of this offset or eccentricity. It is also recognized that for a given operating pressure the torque delivered by the motor is proportional to the degree of eccentricity of the axes of rotation of the motor disk and cylinder barrel.

Figure 2:
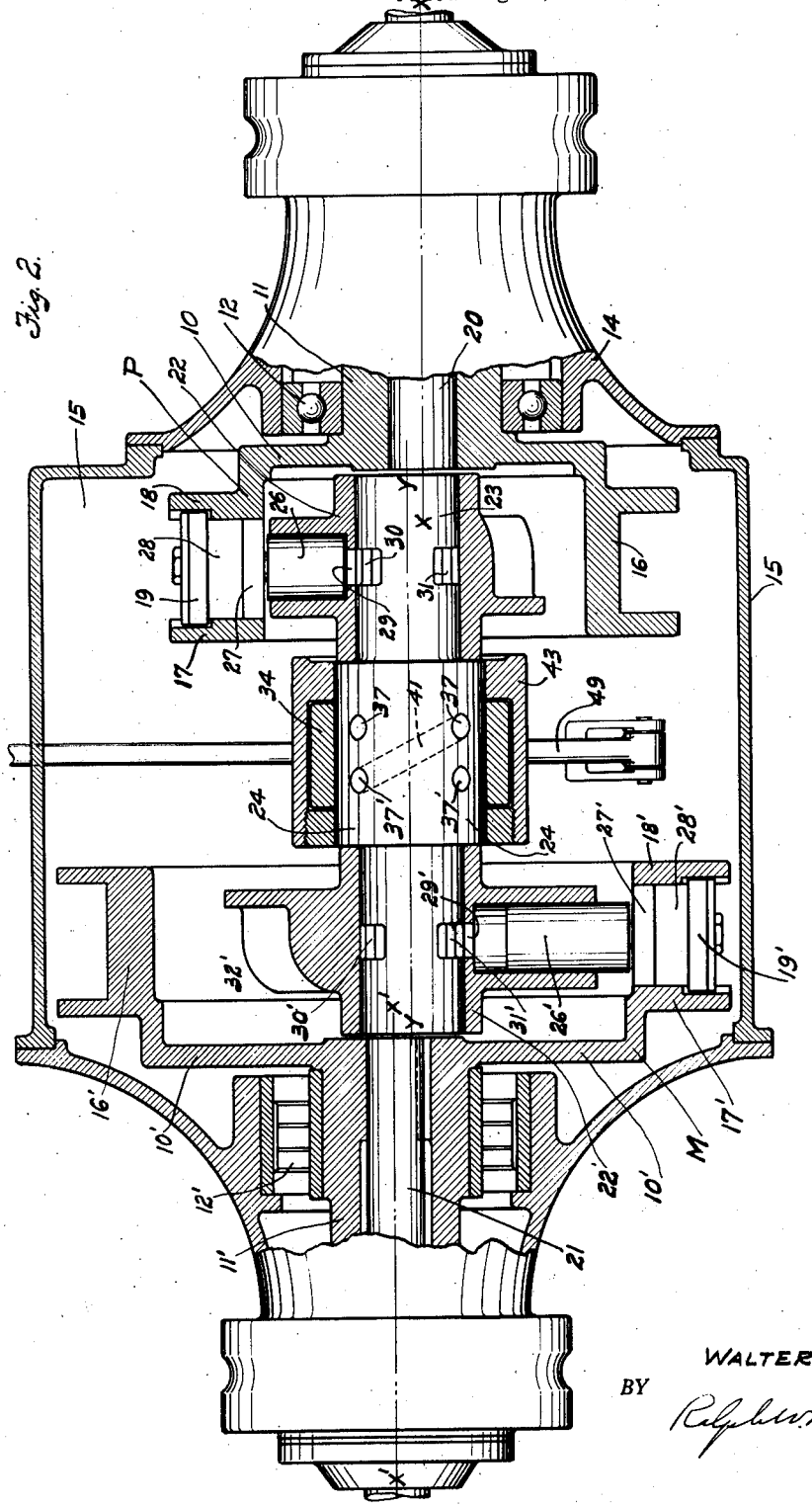
Figure 2 is a horizontal sectional view.

In the hydraulic transmission shown provision is made for varying the displacements of pump and motor simultaneously and in a definite predetermined relation, so that with a given pump speed and operating pressure the motor torque and speed may be varied according to a definite law best suited for a given commercial application. In this instance, the axes of rotation $x-x$ and $x'-x'$ of the pump and motor disks 10 and 10', respectively, are fixed and permanently offset as indicated in Figure 2. The pintle 24 is a substantially straight rigid member so that the axes of rotation of the pump and motor cylinder barrels 22 and 22' coincide with the longitudinal axis $y-y$ thereof. The pintle is horizontally movable, however, so as to shift the axis $y-y$ relative to the axis $x-x$ and $x'-x'$, and for this purpose is secured in an upright frame 43 rockably supported upon a horizontal shaft 44 fixed in the bottom of the casing 15. This frame is suitably fashioned to position and house the valve collar 34 hereinabove described.

The position of the frame 43 and consequently the pintle 24 may be regulated by any appropriate means, such as a control rod 45 projected through the wall 46 of the casing 15 and operatively connected through appropriate linkage 47 with a pair of upright ears 48 formed integral with the frame 43. The valve 34 is shown provided with an integral arm 49 projecting downwardly through a slot 50 in the frame 43 and connected at its lower end 51 with a control rod 52. The arm 49 is of sufficient length and so disposed that the valve 34 is not appreciably affected by the rocking action of the frame 43.

For purposes of illustration, let it be assumed that the distance between the axes of rotation $x-x$ and $x'-x'$ of the pump and motor disks is one half of an inch and that the pintle is horizontally movable so as to shift the axis $y-y$ thereof from an intermediate position, coincident with the pump axis $x-x$, to either side thereof, a distance equal to one quarter of an inch. Thus, during the movement of the pintle from one extreme position to the other the distance between the motor axes $x'-x'$ and $y-y$ varies from one quarter to three quarters of an inch, while the distance between the pump axis $x-x$ and $y-y$ varies from one quarter of an inch in one direction to one quarter of an inch in the opposite direction. In other words, during movement of the pintle between its two extreme positions the stroke of the motor pistons varies from a minimum of one half inch to a maximum of an inch and a half and simultaneously, the stroke of the pump piston varies from a maximum of one half inch to zero and then from zero stroke to a maximum of one half inch, reversing the direction of fluid flow as the pintle passes through zero stroke position.

Let it be assumed that the pump is driven at constant speed in one direction by the shaft 20 and that the parts are in the position shown in Figure 2 with the pintle axis $y-y$ in one extreme position between the axes $x-x$ and $x'—x'$. In this position of the parts, the pump is at maximum stroke and the motor at minimum stroke. Under these conditions the motor operates at maximum speed and applies a minimum torque to the shaft 21. This is an ideal condition for effecting a high speed return stroke of a driven reciprocating member. Then as the pintle is shifted from this position in such direction that the axis $y—y$ thereof approaches the axis $x—x$ of the pump the motor stroke is increased and the pump stroke simultaneously decreased, thus causing a very fast reduction in motor speed until the axis $y—y$ coincides with axes $x—x$ at which time the motor comes to rest. Adjustment of the pintle in this direction effects an increase in motor torque. As the pintle is shifted further in the same direction from that position in which the axis $y—y$ coincides with the axis $x—x$ both the motor and pump strokes increase with the result that the torque of the motor increases and the motor operates at increasing speeds in the opposite direction. This is a condition best suited for producing a working or feeding stroke of a driven reciprocating member.

In the transmission shown the operating characteristics thereof may be modified by shifting the valve 34. Thus, by shifting this valve during adjustment of the pump through zero stroke position the motor may be made to operate in one direction only, instead of reversing at the time of pump reversal.

Various changes may be made in the embodiment of the invention hereinabove specifically described, without departing from or sacrificing any of the advantages of the invention as defined in the appended claims.

I claim:

1. A hydraulic transmission unit comprising a variable stroke pump including a series of piston and cylinder assemblies grouped about a center, a variable displacement motor, including a series of piston and cylinder assemblies grouped about a center and having a greater maximum stroke than the pump, a member extending from the center of the pump to the center of the motor and movable to simultaneously vary the stroke of both, and passages in said member forming hydraulic connections between said pump and motor.

2. A hydraulic transmission unit comprising a variable stroke pump, a variable stroke motor having a greater maximum stroke than the pump, a member having fluid passages connecting said pump and motor and movable to simultaneously vary the stroke of both, and means for moving said member to vary the stroke of the pump through zero stroke position without reducing the stroke of the motor to zero.

3. A variable speed transmission unit comprising a casing, a variable displacement pump therein, a variable torque motor therein of greater capacity than said pump, a member having fluid passages connecting said pump and motor, and means for adjusting said member to simultaneously vary the displacement of said pump and the torque of said motor.

4. In a hydraulic transmission the combination of a pump having two coacting rotary members, one of which rotates about a fixed axis, a motor having two coacting rotary members, one of which rotates about a fixed axis offset from said first named axis, fluid connections between said pump and motor, and an adjustable support for the other member of the pump and the other member of the motor movable to shift the axes of rotation thereof relative to said fixed axes.

5. In a hydraulic transmission the combination of an adjustable support, a pump having a rotary member mounted on said support and a second coacting member rotatable about a fixed axis, a motor having a rotary member mounted on said support and a second coacting member rotatable about a fixed axis offset from said first named axis, and means for adjusting said support.

6. A hydraulic transmission comprising a variable displacement pump, a hydraulic motor, a member having passages communicating with the pump and passages communicating with the motor, means for moving said member to vary the stroke of the pump, and a valve on said member controlling communication between said passages to reverse said motor.

7. A hydraulic transmission comprising a variable displacement pump, a variable torque motor, a member movable to simultaneously vary pump displacement and motor torque, control means for said member, passages in said member communicating with said pump, passages in said member communicating with said motor, and valve mechanism controlling communication between said passages to reverse said motor.

8. In a hydraulic transmission the combination of a variable stroke pump, a variable stroke motor driven thereby, a member connecting said pump and motor and movable to regulate the stroke thereof, fluid passages in said member communicating with said pump and motor, and a valve associated with said member for controlling said passages to reverse said motor.

9. In a hydraulic transmission the combination of a variable stroke pump including a radial series of piston and cylinder assemblies, a member movable to vary pump stroke and having a passage for receiving the discharge from said pump, passages for receiving liquid from said first named passage, a motor fed by said last named passages, and valve mechanism adjustable to connect said first named passage with either of said last named passages selectively to thereby reverse said motor.

10. A hydraulic transmission comprising a reversible flow variable displacement pump, a variable displacement motor, a member having fluid passages connecting said pump and motor and movable to simultaneously vary the displacement of both, said motor having a wider range of adjustment than said pump to permit a full range of adjustment of said pump through zero stroke position without reducing the displacement of said motor to zero.

11. A hydraulic transmission comprising a reversible flow variable displacement pump, a variable displacement motor, hydraulic driving connections between said pump and motor, and means for simultaneously varying the displacement of said pump and motor to vary the speed and torque of said motor, said motor having a greater range of adjustment than said pump to thereby permit a full range adjustment of said pump through zero stroke position without reducing motor stroke to zero.

In witness whereof, I hereunto subscribe my name this 13th day of February, 1925.

WALTER FERRIS.